United States Patent
Tate

(10) Patent No.: US 11,683,404 B2
(45) Date of Patent: *Jun. 20, 2023

(54) COMMUNICATION NETWORK SYSTEM AND METHOD FOR NETWORK COMMUNICATION

(71) Applicant: connectFree Corporation, Kyoto (JP)

(72) Inventor: Kristopher Andrew Tate, Kyoto (JP)

(73) Assignee: connectFree Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,007

(22) Filed: Dec. 10, 2021

(65) Prior Publication Data

US 2022/0103663 A1 Mar. 31, 2022

Related U.S. Application Data

(63) Continuation of application No. 16/967,428, filed as application No. PCT/JP2018/033887 on Sep. 12, 2018, now Pat. No. 11,218,577.

(30) Foreign Application Priority Data

Feb. 6, 2018 (JP) .................................. 2018-018928

(51) Int. Cl.
*H04L 69/324* (2022.01)
*H04L 9/40* (2022.01)
(Continued)

(52) U.S. Cl.
CPC ........ *H04L 69/324* (2013.01); *H04L 61/5007* (2022.05); *H04L 63/0876* (2013.01); *H04L 67/01* (2022.05); *H04L 69/329* (2013.01)

(58) Field of Classification Search
CPC . G06F 21/44; H04L 61/5007; H04L 61/5014; H04L 61/5084; H04L 63/0876;
(Continued)

(56) References Cited

U.S. PATENT DOCUMENTS 7,249,374 B1 7/2007 Lear et al.
2001/0047484 A1* 11/2001 Medvinsky ......... H04L 61/5014
726/5
(Continued)

FOREIGN PATENT DOCUMENTS

JP 2002-344474 A 11/2002
JP 2003-169069 A 6/2003
(Continued)

OTHER PUBLICATIONS

Office Action for TW Application No. 107132205 dated May 5, 2022. (4 pages).
(Continued)

*Primary Examiner* — Le H Luu
(74) *Attorney, Agent, or Firm* — Merchant & Gould P.C.

(57) ABSTRACT

A network system includes at least one server device and at least one terminal device that accesses any of the at least one server device. The terminal device authenticates a network address between the terminal device and any of the at least one server device and communicates data with any of the at least one server device. When the server device receives a request from the terminal device, it provides a service in accordance with the authenticated network address held by the terminal device that has issued the request.

18 Claims, 9 Drawing Sheets

(51) Int. Cl.
    *H04L 69/329*     (2022.01)
    *H04L 61/5007*     (2022.01)
    *H04L 67/01*     (2022.01)

(58) Field of Classification Search
    CPC . H04L 63/0272; H04L 63/0853; H04L 67/01; H04L 69/324; H04L 69/329; H04L 41/12; H04L 45/66; H04L 67/52; H04L 9/3268; B60R 16/03
    See application file for complete search history.

(56) References Cited

U.S. PATENT DOCUMENTS

| | | | | |
|---|---|---|---|---|
| 2004/0268121 | A1* | 12/2004 | Shelest | H04L 63/0853 726/15 |
| 2005/0193127 | A1* | 9/2005 | Moore | H04L 41/12 709/228 |
| 2005/0216587 | A1 | 9/2005 | John | |
| 2009/0007234 | A1* | 1/2009 | Birger | H04L 67/52 713/168 |
| 2011/0007705 | A1* | 1/2011 | Buddhikot | H04L 69/329 726/4 |
| 2012/0304259 | A1 | 11/2012 | Wen et al. | |
| 2013/0139232 | A1* | 5/2013 | Carolan | H04L 61/5084 726/6 |
| 2013/0250933 | A1* | 9/2013 | Yousefi | B60R 16/03 370/338 |
| 2015/0188949 | A1* | 7/2015 | Mahaffey | H04L 63/0272 726/1 |
| 2016/0044023 | A1* | 2/2016 | Barr | H04L 9/3268 726/1 |
| 2016/0081006 | A1* | 3/2016 | Reisslein | H04L 45/66 370/329 |

FOREIGN PATENT DOCUMENTS

| | | |
|---|---|---|
| JP | 2005-244573 A | 9/2005 |
| JP | 2014-138320 A | 7/2014 |
| JP | 2017-059868 A | 3/2017 |
| JP | 2018-207472 A | 12/2018 |
| TW | 201526588 A | 7/2015 |

OTHER PUBLICATIONS

Search Report for European Patent Application No. 18904797.0 (dated Nov. 2, 2021).

* cited by examiner

FIG.3
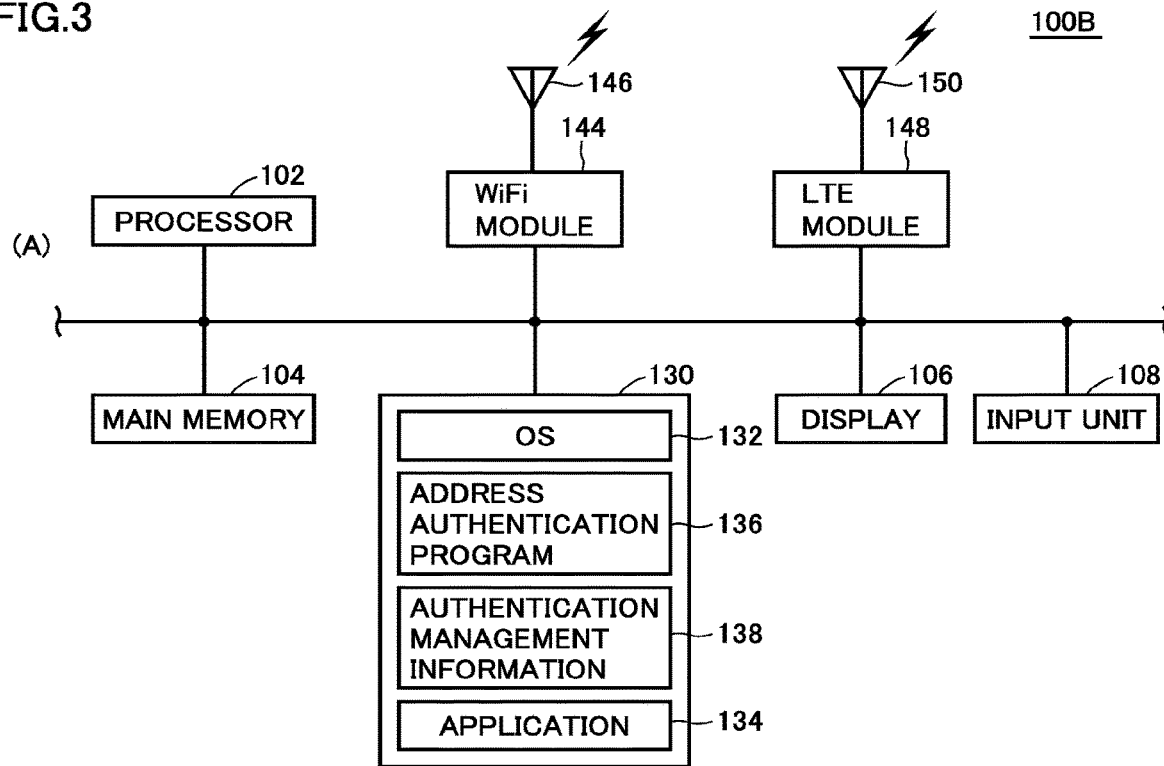
(A)
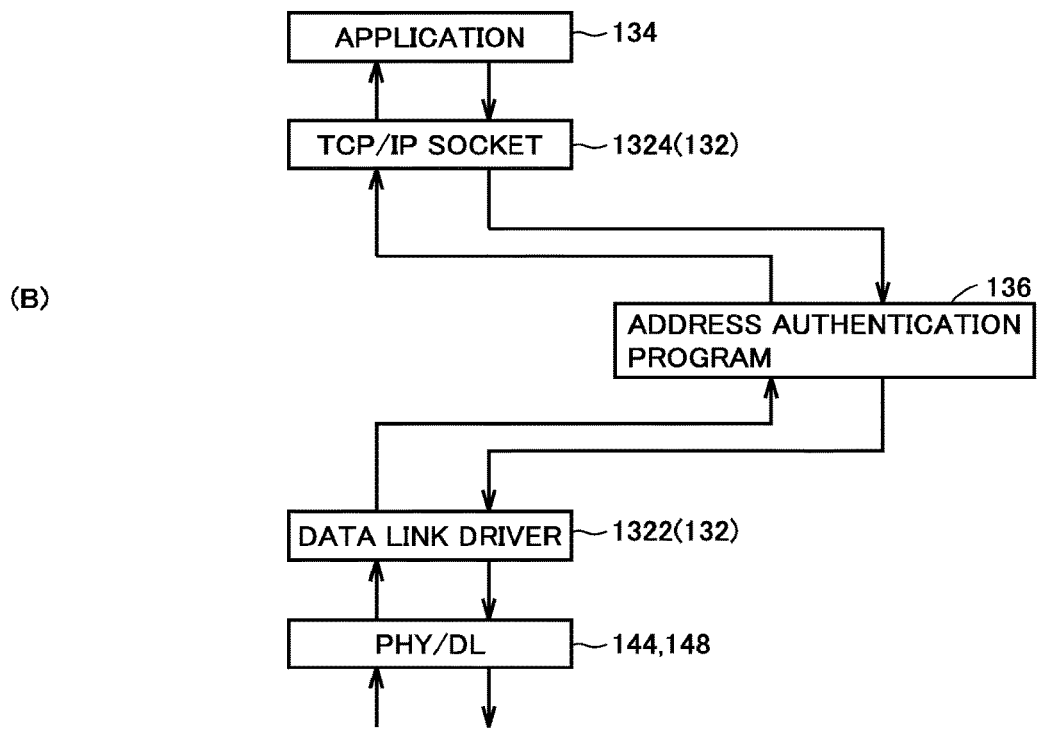
(B)

210

(A)

| IP ADDRESS | INITIAL SCREEN | Preference No. |
|---|---|---|
| 2AB:200FF:FE00:5042 | 0005 | 82849416 |
| 2AB:282CA:8A00:8627 | 0004 | 18384678 |
| 8AD:38ED:ACA82:4052 | 0015 | 98587518 |
| ⋮ | ⋮ | ⋮ |

212　214　216

(B)

230

| IP ADDRESS | Room No. | VALID DURING |
|---|---|---|
| 2AB:200FF:FE00:5042 | 2001 | 180801:15:00-180802:10:00 |
| 2AB:282CA:8A00:8627 | 2002 | 180801:15:00-180804:10:00 |
| 8AD:38ED:ACA82:4052 | 2003 | 180802:15:00-180804:10:00 |
| ⋮ | ⋮ | ⋮ |

(A)

232  234  236

FIG.9
(A)
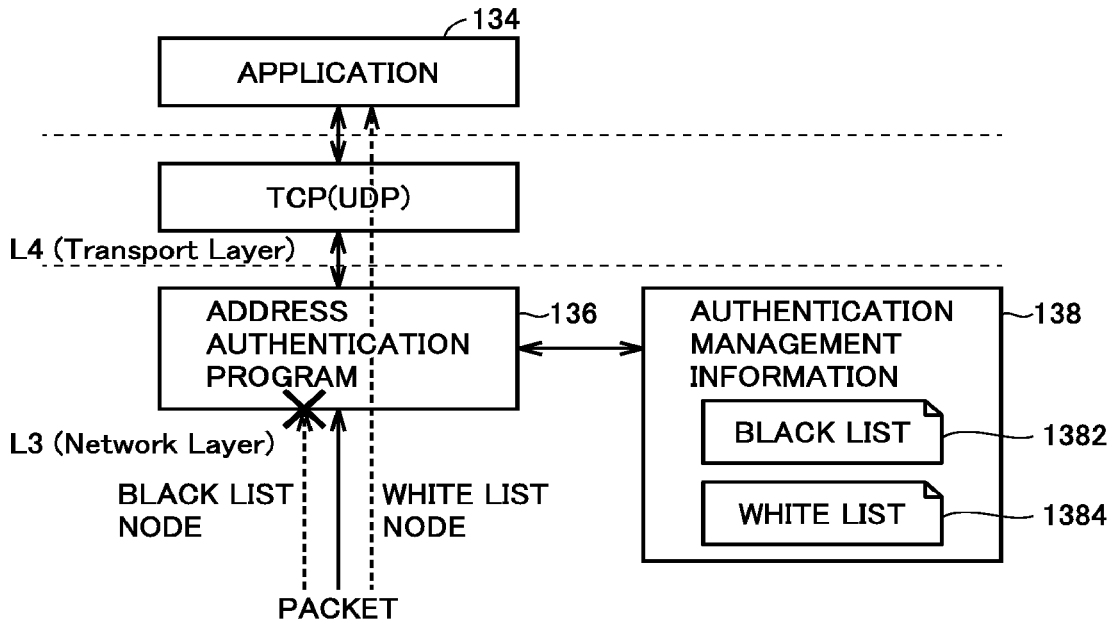
(B)
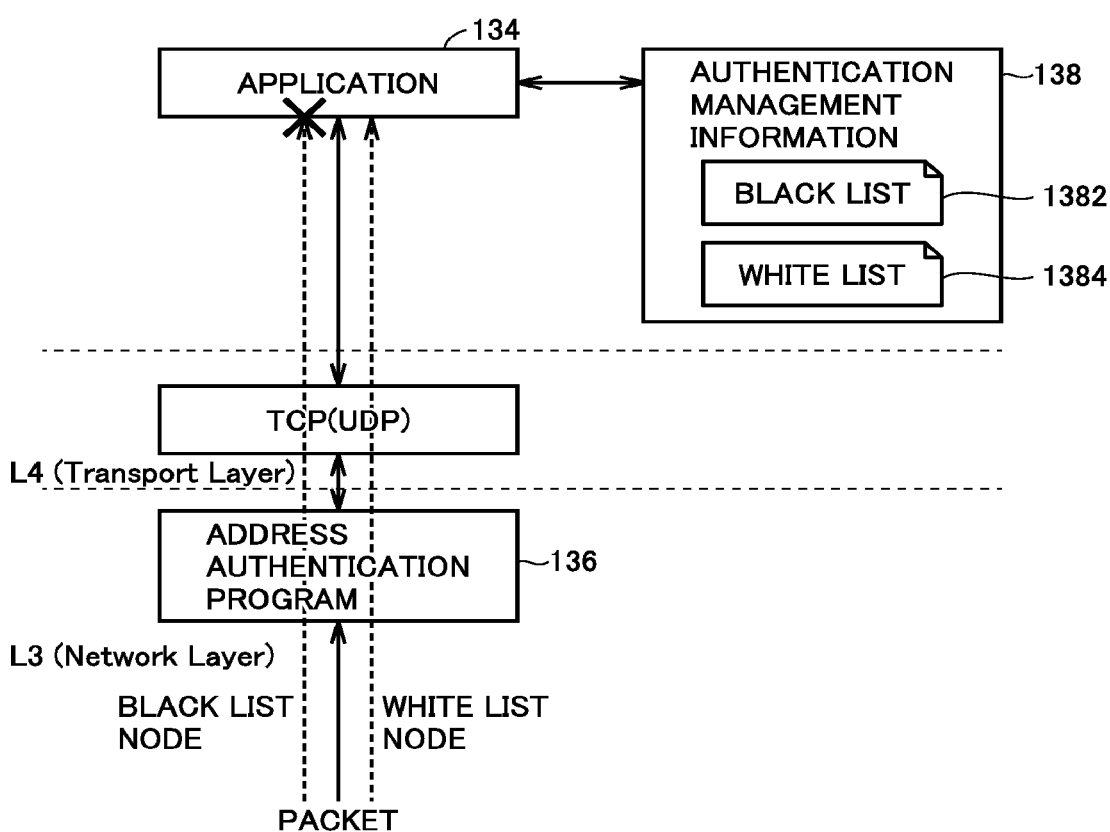

COMMUNICATION NETWORK SYSTEM AND METHOD FOR NETWORK COMMUNICATION

This is a continuation of U.S. patent application Ser. No. 16/967,428, filed Aug. 5, 2020, which is a National Stage Application of PCT/JP2018/033887, filed Sep. 12, 2018, which claims benefit of Japanese Patent Application No. 2018-018928, filed Feb. 6, 2018, which applications are incorporated herein by reference. To the extent appropriate, a claim of priority is made to each of the above disclosed applications.

TECHNICAL FIELD

The present invention relates to a network system based on a new concept of authentication of a network address itself.

BACKGROUND ART

Information and communication technology (ICT) has remarkably progressed in recent years and devices connected to networks such as the Internet are not limited to such information processing apparatuses as conventional personal computers or smartphones but include various things. Such a technological trend is referred to as "Internet of Things (IoT)" and various technologies and services have been proposed and put into practical use. In the future, the world in which several billion people and ten billion or several trillion devices on the Earth are simultaneously connected is expected. In order to realize such a networked world, a simpler and safer solution that allows freer connection should be provided.

Normally over a network, data is communicated between devices by using a network address statically or dynamically allocated to each device. Typically, an Internet protocol (IP) address is adopted as such a network address.

In general, some IP addresses such as global addresses are uniquely set over the Internet and other IP addresses such as private addresses are allocated exclusively over a private network. There is also such a scheme as dynamically allocating an IP address based on a dynamic host configuration protocol (DHCP).

Thus, in setting an IP address, for data communication, attention is paid only to exclusively allocating IP addresses over the same network. Namely, the IP address is a network address arbitrarily set in accordance with a network of interest.

For example, Japanese Patent Laying-Open No. 2017-059868 (PTL 1) discloses a configuration that reduces man-hours for setting, an IP address.

CITATION LIST

Patent Literature

PTL 1: Japanese Patent Laying-Open No. 2017-059868

SUMMARY OF INVENTION

Technical Problem

As described above, a network address so far has served as identification information for identifying a destination, however, no reliability has been provided to such an address itself. Therefore, though data is communicated between devices by using the IP address, authentication processing or the like has been performed in a higher layer (for example, an application layer).

Therefore, in order to provide a service requiring various types of authentication processing, an application for performing authentication processing as the basis for the service should be provided in advance or each time, which has interfered with prevalence.

The present invention provides a solution to the problem as described above.

Solution to Problem

A network system according to one aspect of the present invention includes at least one server device and at least one terminal device that accesses any of the at least one server device. The terminal device authenticates a network address between the terminal device and any of the at least one server device and communicates data therewith. When the server device receives a request from the terminal device, the server device provides a service in accordance with the authenticated network address held by the terminal device that has issued the request.

Preferably, the server device identifies the terminal device that has issued the request, based only on the network address used in interaction with the terminal device through a network layer, without performing authentication processing in an application layer.

Preferably, the terminal device includes a first communication program directed to a data link layer, a second communication program directed to a transport layer and a network layer, and an address authentication program connected between the first communication program and the second communication program. The address authentication program authenticates, between the address authentication program and a destination device, the network address to be used for data transmission requested by the second communication program.

Preferably, the terminal device includes a communication function module that provides a communication function and a semiconductor device having the authenticated network address hard-coded thereon. The semiconductor device authenticates the network address between the semiconductor device and a destination device, by using the communication function module.

Advantageous Effects of Invention

According to one form of the present invention, in providing a service adapted to a device or a user who uses the device, neither a special application nor an additional authentication procedure is necessary. Therefore, a response time period involved with provision of a service can be reduced.

BRIEF DESCRIPTION OF DRAWINGS

FIG. 3 is a schematic diagram showing an exemplary configuration of a terminal device according to the present embodiment.

FIG. 9 is a diagram for illustrating exemplary filtering of a network address by utilizing the network system according to the present embodiment.

DESCRIPTION OF EMBODIMENTS

Figure 1:
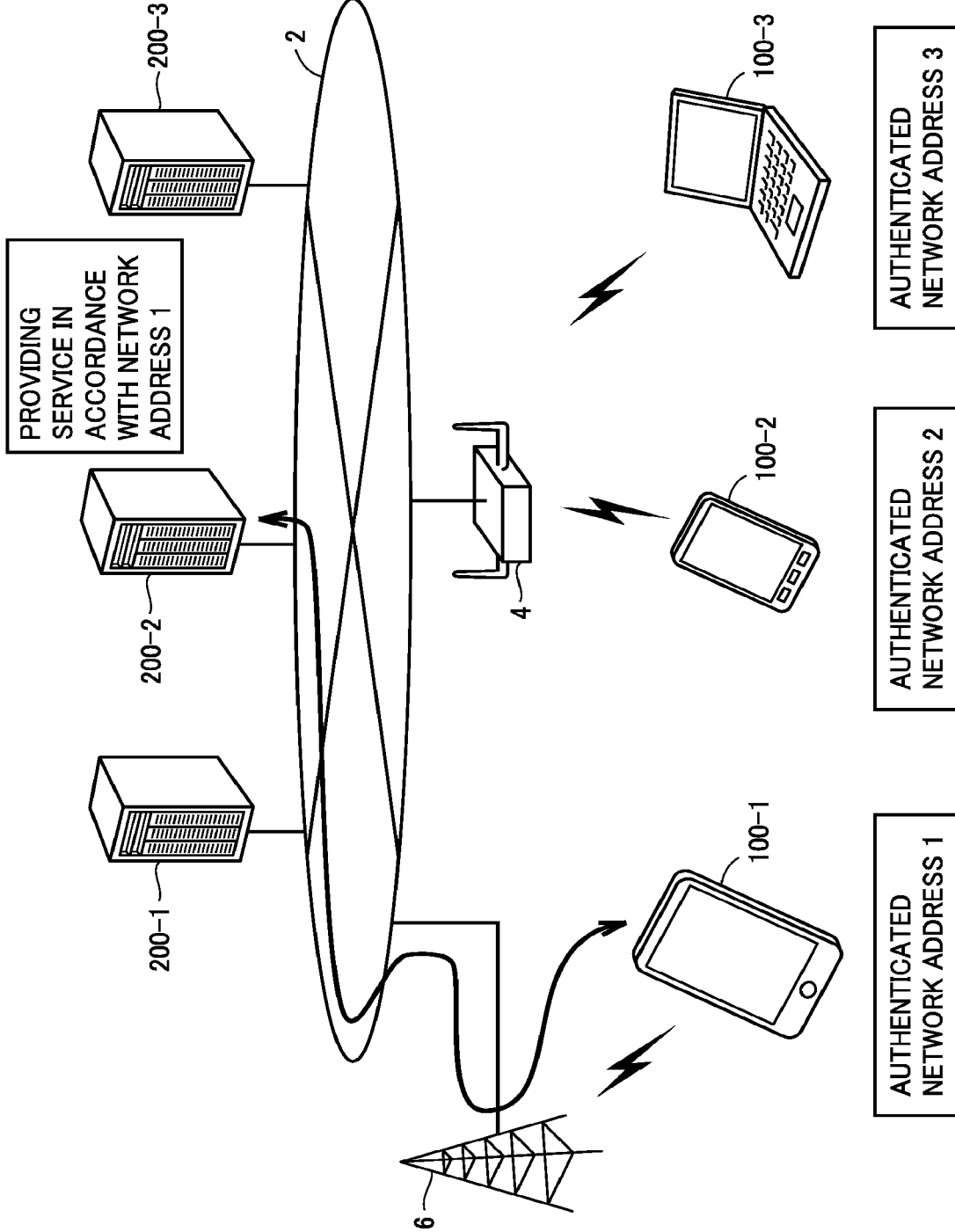
FIG. 1 is a schematic diagram showing an exemplary overall configuration of a network system according to the present embodiment.

An embodiment of the present invention will be described in detail with reference to the drawings. The same or corresponding elements in the drawings have the same reference characters allotted and description thereof will not be repeated.

A. Overview

According to the present embodiment, a service based on an authenticated network address and a platform for providing the service are provided. In a conventional network, there has been no technical concept of authentication of a network address itself and the network address has mainly been used only for establishing communication connection. Then, an authentication procedure has normally been performed by using an application for authentication. In contrast, since a network address itself is authenticated in the present embodiment, establishment of communication connection per se also serves as the authentication procedure and an additional authentication procedure or the like by using an application is not required.

Therefore, in providing a service adapted to a device or a user who uses the device, neither a special application nor an additional authentication procedure is required. Therefore, a response time period involved with provision of a service can be reduced.

A "network address" herein means identification information for uniquely identifying a device over some network and it is generally constituted of a character string including combination of characters, numerics, and/or signs. Though an Internet protocol (IP) address is assumed as a typical example of the network address, a lower-order address such as a media access control (MAC) address or a higher-order address such as a host name or a uniform resource locator (URL) managed by a domain name system (DNS) may be applicable. Regardless of a difference in network such as a global network and a private network, a protocol to be used can also arbitrarily be selected. A network address specific to an adopted protocol may be adopted as the network address.

When an IP address is typically adopted, the defined number of bits is different for each version. Under the currently established Internet protocol version 4 (IPv4), a 32-bit address space is defined, and under the currently established Internet protocol version 6 (IPv6), a 128-bit address space is defined. In the present embodiment, an IP address in conformity with IPv6 is mainly described as the network address.

An "authenticated network address" herein means a state that authenticity of the network address allocated to each device is guaranteed to a destination or a third party, that is, a state guaranteeing that a network address used by each device for data communication is not spoofed, by adopting a scheme as will be described later.

A "device" herein encompasses arbitrary things that can communicate data over a network. Typically, the device may be implemented as a single communication apparatus or may be implemented as a part of something or as being incorporated in something.

B. Overall Configuration of Network System

An overall configuration of a network system 1 according to the present embodiment will initially be described.

FIG. 1 is a schematic diagram showing an exemplary overall configuration of network system 1 according to the present embodiment. Referring to FIG. 1, terminal devices 100-1, 100-2, 100-3, . . . representing exemplary devices (which may also collectively be referred to as a "terminal device 100" below) and server devices 200-1, 200-2, 200-3, . . . representing other devices (which may also collectively be referred to as a "server device 200" below) are connected to a network 2 such as the Internet.

For example, a smartphone or a portable telephone is assumed as terminal device 100-1 and terminal device 100-1 is connected to network 2 with a base station 6 provided by a mobile communication entity being interposed. For example, a tablet is assumed as terminal device 100-2, and for example, a lap-top personal computer is assumed as terminal device 100-3. Terminal devices 100-2 and 100-3 are connected to network 2, for example, with an access point 4 being interposed.

Each of server devices 200-1, 200-2, 200-3, . . . is a device that provides an arbitrary service. Each server device 200 provides a requested service by being accessed from any terminal device 100.

Thus, network system 1 includes at least one server device 200 (a second device) and at least one terminal device 100 (a first device) that can access any of at least one server device 200.

In network system 1 according to the present embodiment, server device 200 can obtain an authenticated network address of terminal device 100 which has accessed the server device. Similarly, terminal device 100 can obtain an authenticated network address of server device 200 that the terminal device has accessed.

Processing for mutually authenticating the network address is performed between terminal device 100 and server device 200 and successful authentication of the network address allows start of data communication. Namely, terminal device 100 authenticates the network address between the terminal device and any of at least one server device and communicates data therewith. By adopting such a configuration for data communication, terminal device 100 and server device 200 can mutually obtain the authenticated network address of the destination.

For example, when server device 200 receives a request from terminal device 100, it provides a service in accordance with the authenticated network address of terminal device 100 that has issued the request. Namely, server device 200 can provide a service in accordance with the obtained authenticated network address to terminal device 100 that has issued the request. An exemplary service in accordance with the network address will be described later. Since terminal device 100 can also obtain the authenticated network address of server device 200, it can also transmits a specific command in accordance with destination server device 200.

Thus, in network system 1 according to the present embodiment, the authenticated network address of each terminal device 100 can be obtained so that a service specific to each terminal device 100 can be provided without requiring an application for performing authentication processing. Since data communication between devices such as terminal device 100 and server device 200 means obtainment of the authenticated network address, a time period required for providing a service specific to terminal device 100 is also extremely short and waiting time until provision of a service can be shorter than in a configuration in which authentication processing is performed with the use of an application.

C. Configuration of Device for Realizing Authentication of Network Address

An exemplary configuration of a device for realizing authentication of a network address used in network system 1 according to the present embodiment will now be described. In order to realize authentication of a network address, for example, a hardware implementation and a software implementation are assumed. An exemplary implementation will be described below.

(c1: Hardware Implementation)

Figure 2:
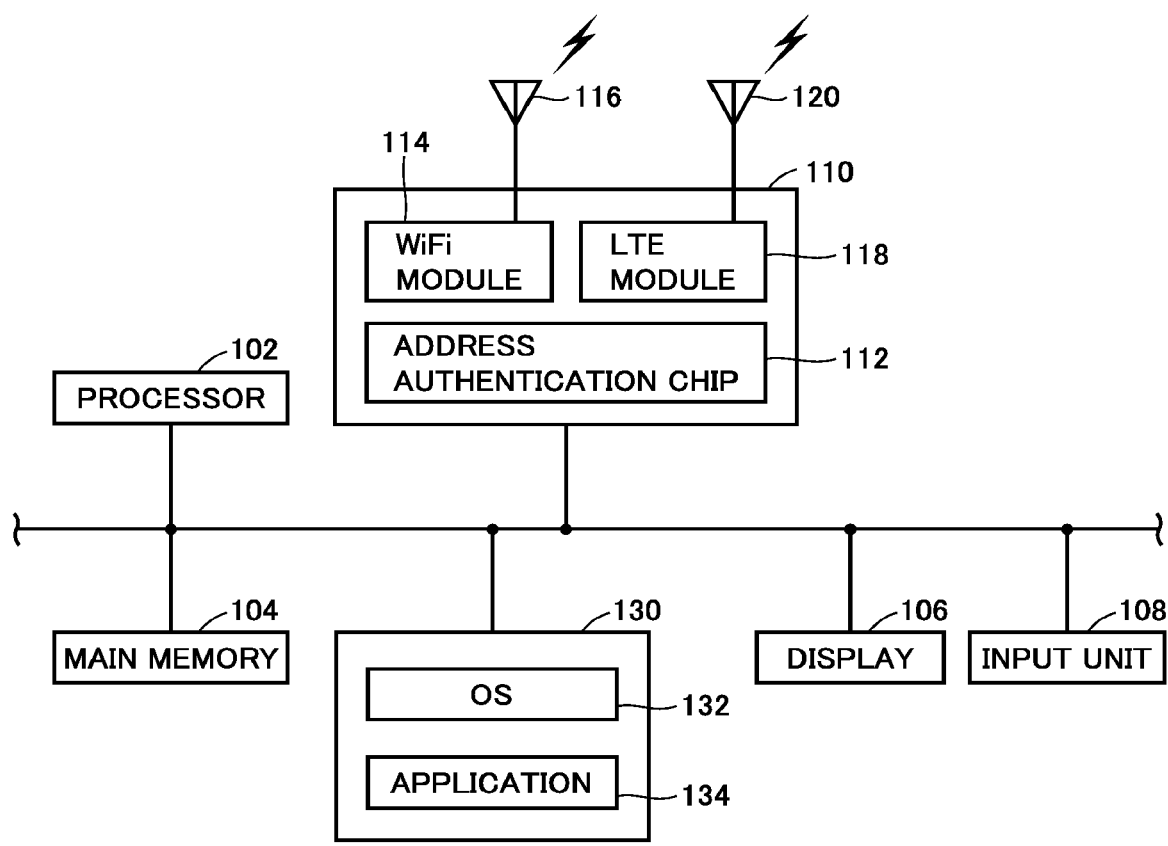
FIG. 2 is a schematic diagram showing an exemplary configuration of a terminal device according to the present embodiment.

FIG. 2 is a schematic diagram showing an exemplary configuration of a terminal device 100A according to the present embodiment. Referring to FIG. 2, terminal device 100A includes a processor 102, a main memory 104, a display 106, an input unit 108, a communication module 110, and a secondary storage 130.

Processor 102 is a processing entity that performs various types of processing in terminal device 100A. Processor 102 develops and executes a program or various instructions stored in secondary storage 130 on main memory 104.

Main memory 104 is a volatile storage such as a dynamic random access memory (DRAM) or a static random access memory (SRAM). Secondary storage 130 is a non-volatile storage such as a flash memory or a hard disk. Secondary storage 130 stores an operating system (OS) 132 and one or more arbitrary applications 134.

Display 106 is a component that presents a result of processing by processor 102 to the outside, and implemented, for example, by a liquid crystal display (LCD) or an organic electro-luminescence (EL) display.

Input unit 108 is a component that accepts an operation by a user and implemented, for example, by an arbitrary input apparatus such as a keyboard, a touch panel, or a mouse.

Communication module 110 is a main component that provides an authenticated network address and includes an address authentication chip 112, a WiFi module 114, and an LTE module 118.

Address authentication chip 112 is a semiconductor device having an authenticated network address and information necessary for authentication hard-coded thereon, and authenticates a network address in communicating data with another device by means of WiFi module 114 and/or LTE module 118.

More specifically, in data communication by means of WiFi module 114 or LTE module 118, address authentication chip 112 performs processing for mutually authenticating, between the address authentication chip and another device, an authenticated network address provided in advance. Address authentication chip 112 thus authenticates a network address between the address authentication chip and a destination device, by means of a communication function module (WiFi module 114 and/or LTE module 118). Circuitry which is resistant against tampering is preferably adopted as address authentication chip 112.

WiFi module 114 and/or LTE module 118 provide(s) a function of the physical layer and the data link layer of the open systems interconnection (OSI) reference model, WiFi module 114 provides, as being connected to an antenna 116, a wireless communication function in conformity with a wireless access scheme such as wireless local area network (LAN) or WiMAX. LTE module 118 provides, as being connected to an antenna 120, a wireless communication function in conformity with a wireless access scheme such as long term evolution (LIE), wideband code division multiple access (W-CDMA), or CDMA2000.

Though communication module 110 including WiFi module 114 and/or LTE module 118 is exemplified for the sake of convenience of description, both of the modules do not necessarily have to be included. Any one module alone may be incorporated or one or more modules providing other communication functions may be incorporated. In that case, not only a wireless communication function but also a wired communication function may be provided as the communication function.

Communication module 110 thus includes a communication function module (WiFi module 114 and/or LTE module 118) that provides the communication function and a semiconductor device (address authentication chip 112) having an authenticated network address hard-coded thereon.

By adopting the hardware implementation as set forth above, the authenticated network address can be provided and obtained in terminal device 100A.

(c2: Software Implementation)

FIG. 3 is a schematic diagram showing an exemplary configuration of a terminal device 100B according to the present embodiment. Referring to (A) of FIG. 3, terminal device 100B includes processor 102, main memory 104, display 106, input unit 108, secondary storage 130, a WiFi module 144, and an LTE module 148.

Processor 102 is a processing entity that performs various types of processing in terminal device 100B. Processor 102 develops and executes a program or various instructions stored in secondary storage 130 on main memory 104. Secondary storage 130 stores an address authentication program 136 and authentication management information 138 in addition to OS 132 and one or more arbitrary applications 134.

WiFi module 144 and/or LTE module 148 provide(s) the function of the physical layer and the data link layer of the OSI reference model. WiFi module 144 provides, as being connected to an antenna 146, the wireless communication function in conformity with a wireless access scheme such as wireless LAN or WiMAX. LTE module 148 provides, as being connected to an antenna 150, a wireless communication function in conformity with a wireless access scheme such as LTE, W-CDMA, or CDMA2000.

Though the configuration including WiFi module 144 and/or LTE module 148 is exemplified for the sake of convenience of description, both of the modules do not necessarily have to be included. Any one module alone may be incorporated or one or more modules providing other communication functions may be incorporated. In that case, not only a wireless communication function but also a wired communication function may be provided as the communication function.

As a result of execution of address authentication program 136 in terminal device 100B, the authenticated network address is provided. A software configuration for providing an authenticated network address will be exemplified below.

FIG. 3 shows at (B) a schematic diagram for illustrating processing involved with data communication in terminal device 100B. As shown in (B) of FIG. 3, WiFi module 144 and/or LTE module 148 providing the function of the physical layer realize(s) transmission/reception of a real signal (data) by means of a data link driver 1322 (a function of a part of OS 132).

Application 134 such as a web browser utilizes a TCP/IP socket 1324 for data communication. TCP/IP socket 1324 may be provided as a function of a part of OS 132. Though FIG. 3 illustrates at (B) TCP/IP socket 1324 by way of example, for example, a UDP/IP socket may be adopted.

TCP/IP socket 1324 normally realizes data transmission and data reception to and from another device by internally transmitting/receiving data to/from data link driver 1322.

In contrast, in terminal device 100B according to the present embodiment, address authentication program 136 is arranged between TCP/IP socket 1324 and data link driver 1322. Address authentication program 136 authenticates a network address allocated to each device mutually between the address authentication program and a destination device in a specific session, and only when authentication is successful, the address authentication program transmits and receives data in the specific session. By adopting such a scheme, from a point of view of application 134, transparency can be maintained without being conscious about presence of address authentication program 136. Namely, application 134 should only transmit a packet including necessary data, and can rely on and use a network address included in a header of a packet received from any device, as it is.

Address authentication program 136 mutually authenticates a network address between the address authentication program and another device based on information stored in authentication management information 138 prepared in advance in a secure manner. Authentication management information 138 includes not only a network address allocated to each device but also a code for ensuring that the network address is authentic (that is, authenticated). Address authentication program 136 mutually authenticates a network address by transmitting additional information included in authentication management information 138 to a destination, together with the network address defined in authentication management information 138.

Without being limited to a destination device with which data is communicated, the address authentication program may authenticate a network address between the address authentication program and an external authentication server device or the like.

Thus, terminal device 100B includes a communication program (data link driver 1322) directed to the data link layer, a communication program (TCP/IP socket 1324) directed to the transport layer and the network layer, and address authentication program 136 connected between data link driver 1322 and TCP/IP socket 1324.

Though FIG. 3 shows a configuration in which address authentication program 136 is logically arranged between layers of TCP/IP socket 1324 and data link driver 1322, any implementation may be applicable without being limited as such, so long as address authentication program 136 can mutually authenticate a network address between the address authentication program and a destination.

For example, TCP/IP socket 1324 and address authentication program 136 may be arranged logically in parallel, and TCP/IP socket 1324 may be prevented from starting transmission and reception of a packet unless a network address is authenticated between address authentication program 136 and a destination device. In this case, once address authentication program 136 authenticates a network address, transmission/reception of data is thereafter continued between TCP/IP socket 1324 and data link driver 1322 and address authentication program 136 does not have to be involved with internal data transfer.

Since corresponding components among components of terminal device 100B are the same as those in terminal device 100A, detailed description will not be repeated.

By adopting the software implementation as set forth above, an authenticated network address can be provided to terminal device 100B.

(c3: Another Software Implementation)

Figure 4:
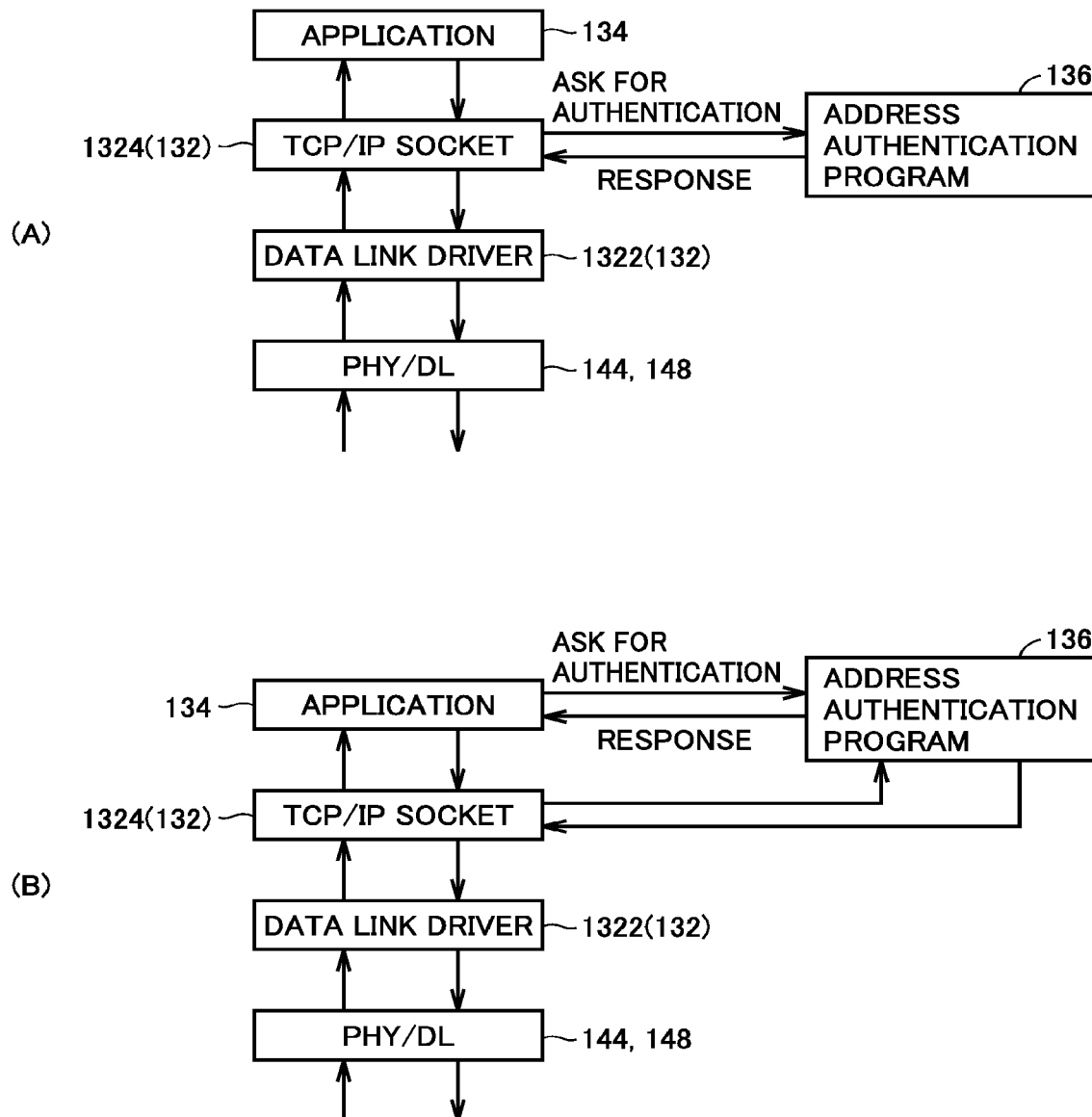
FIG. 4 is a schematic diagram showing another exemplary configuration of the terminal device according to the present embodiment.

Without being limited to the functional configuration involved with data communication shown in (B) of FIG. 3, another implementation may be adopted. FIG. 4 is a schematic diagram showing another exemplary configuration of the terminal device according to the present embodiment.

In an exemplary implementation shown in (A) of FIG. 4, above a general layered structure, that is, the physical layer and the data link layer (WiFi module 144 and/or LTE module 148), data link driver 1322 and TCP/IP socket 1324 are sequentially arranged. Arbitrary application 134 uses TCP/IP socket 1324 for data communication.

In the exemplary implementation shown in (A) of FIG. 4, at the time of start of or during transmission/reception of data by TCP/IP socket 1324 to/from a destination node, TCP/IP socket 1324 asks address authentication program 136 to authenticate the destination. Address authentication program 136 determines, by performing authentication processing as described above, whether or not the destination is a reliable node or whether or not data transmitted/received to/from the destination has been tampered, and provides a result thereof to TCP/IP socket 1324. Basic processing by address authentication program 136 is similar to that by address authentication program 136 shown in (B) of FIG. 3 described above.

In the implementation as shown in (A) of FIG. 4, TCP/IP socket 1324 asks address authentication program 136 to perform necessary authentication processing. Therefore, from a point of view of application 134, secure communication with the destination having the authenticated network address can be established by using the interface the same as in normal communication.

In an exemplary implementation shown in (B) of FIG. 4, above the general layered structure, that is, the physical layer and the data link layer (WiFi module 144 and/or LTE module 148), data link driver 1322 and TCP/IP socket 1324 are sequentially arranged. Arbitrary application 134 uses TCP/IP socket 1324 for data communication and also interacts with address authentication program 136 for necessary authentication.

In the exemplary implementation shown in (B) of FIG. 4, at the time of or during transmission/reception of data by application 134 to/from a destination node, application 134 asks address authentication program 1136 to authenticate the destination. Address authentication program 136 transmits/receives data to/from TCP/IP socket 1324 and determines, by performing authentication processing as described above, whether or not the destination is a reliable node or whether or not data transmitted/received to/from the destination has been tampered. Then, address authentication program 136 provides a result of authentication to application 134. Basic processing by address authentication program 136 is the same as that by address authentication program 136 shown in (B) of FIG. 3 described above.

By adopting the implementation as shown in (B) of FIG. 4, secure communication with the destination having the authenticated network address can be established without changing a structure of a communication layer such as data link driver 1322 and TCP/IP socket 1324.

(c4: Interaction Between Devices)

Exemplary interaction between devices such as terminal device 100 and server device 200 will now be described.

Figure 5:
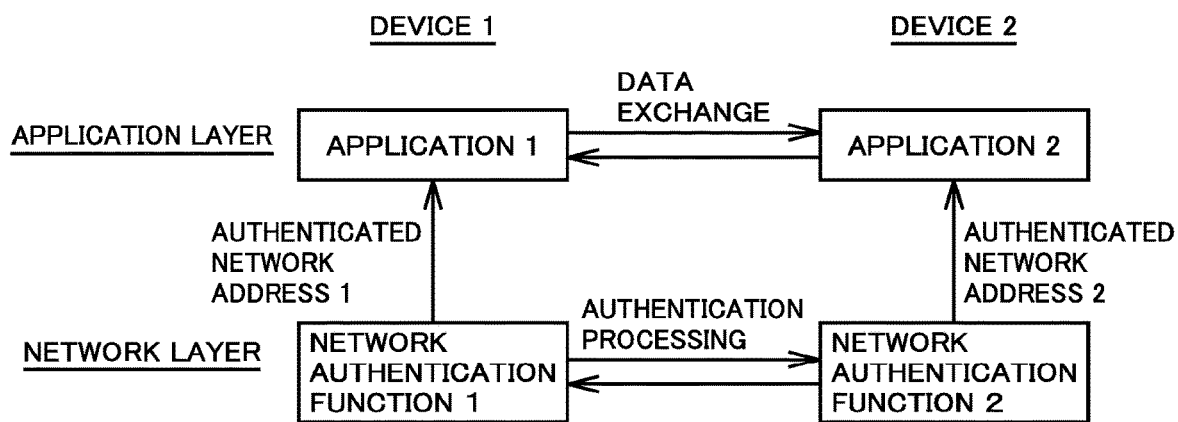
FIG. 5 is a schematic diagram for illustrating interaction between devices in the network system according to the present embodiment.

FIG. 5 is a schematic diagram for illustrating interaction between devices in network system 1 according to the present embodiment. FIG. 5 shows exemplary processing when data is transmitted/received between a device 1 and a device 2.

Referring to FIG. 5, device 1 and device 2 each includes a network authentication function (corresponding to address authentication chip 112 shown in FIG. 2 or address authentication program 136 shown in FIG. 3). The network authentication function of each device performs processing for authenticating a network address. This authentication processing is basically performed in the network layer. When authentication processing is completed, the network authentication function of each device is used as a network address in transmission/reception of data by an application (application layer) executed in each device.

An application or a TCP/IP socket responsible for packet generation and packet reception may be notified of an authenticated network address.

By adopting the configuration as shown in FIG. 5, a mutually authenticated network address can be used without special authentication processing being required on an application side.

D. Exemplary Processing Procedure

An exemplary processing procedure in network system 1 according to the present embodiment will now be described.

Figure 6:
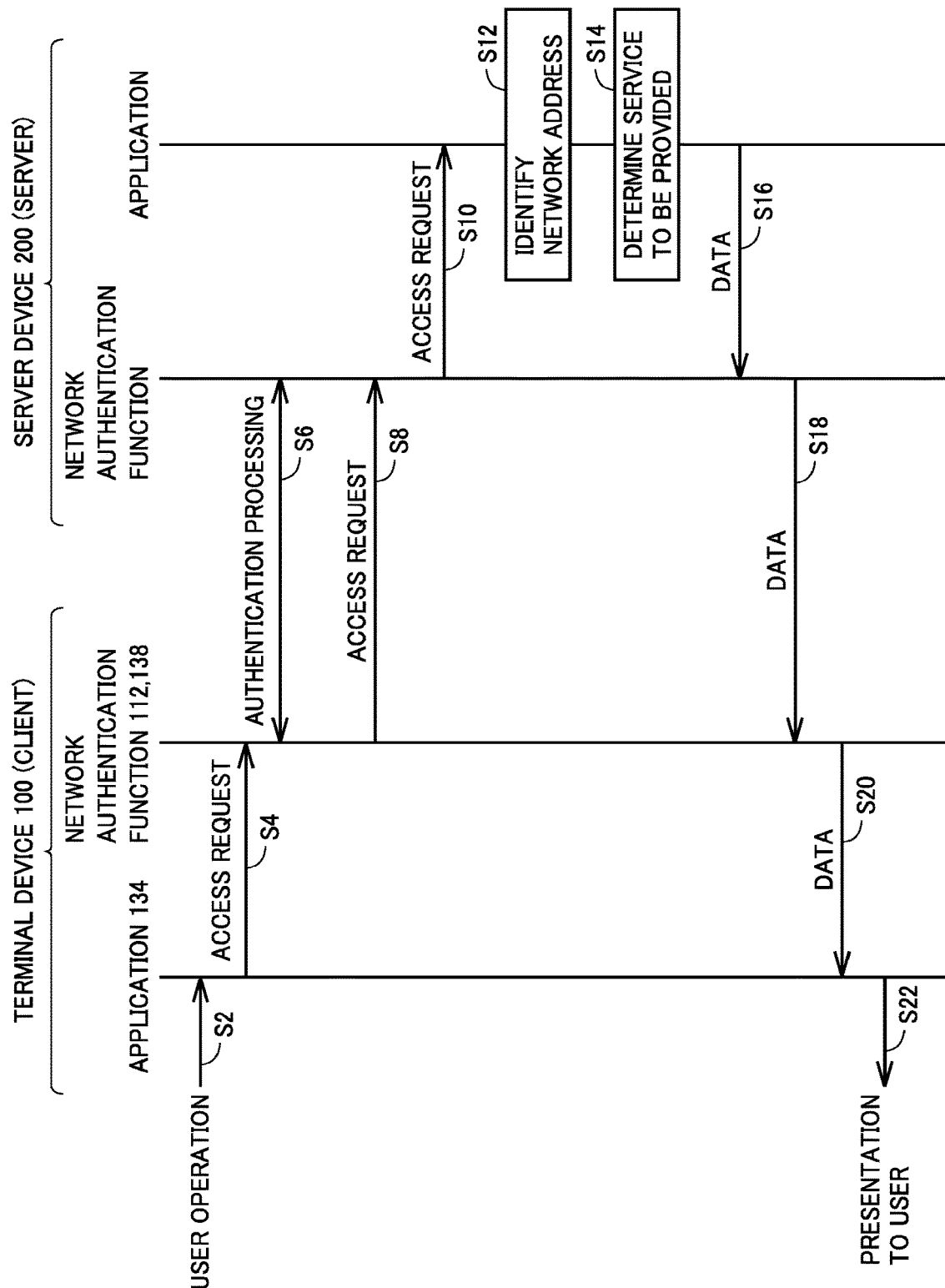
FIG. 6 is a sequence diagram showing an exemplary processing procedure involved with provision of a service in the network system according to the present embodiment.

FIG. 6 is a sequence diagram showing an exemplary processing procedure involved with provision of a service in network system 1 according to the present embodiment. FIG. 6 shows a processing procedure in a typical example where server device 200 provides a requested service in response to access from terminal device 100 to server device 200.

Specifically, referring to FIG. 6, initially, when a user performs some operation on application 134 (step S2), an access request from application 134 to server device 200 is transferred to the network authentication function (address authentication chip 112 shown in FIG. 2 or address authentication program 136 shown in FIG. 3) (step S4). The network authentication function of terminal device 100 performs processing for mutual authentication of a network address between the network authentication function of terminal device 100 and the network authentication function (the function corresponding to address authentication chip 112 shown in FIG. 2 or address authentication program 136 shown in FIG. 3) of server device 200 (step S6). When authentication processing is completed, terminal device 100 uses the authenticated network address to transfer the issued access request to server device 200 (step S8).

In server device 200, the access request transmitted from terminal device 100 is received by the network authentication function, subjected to necessary processing, and transferred to the application (step S10). The application of server device 200 identifies the network address used for communication of data in the access request received from terminal device 100 (step S12) and determines a service to be provided in accordance with the identified network address (step S14).

Then, the application of server device 200 transmits the data in accordance with the determined service to terminal device 100 (step S16). This data is received by the network authentication function of server device 200, subjected to necessary processing, and transmitted to terminal device 100 (step S18).

In terminal device 100, the data transmitted from server device 200 is received by the network authentication function, subjected to necessary processing, and transferred to application 134 (step S20). Then, application 134 presents contents in accordance with the received data to the user (step S22).

In network system 1 according to the present embodiment, when server device 200 is accessed from terminal device 100, it can provide a service specific to terminal device 100 without performing additional authentication processing, because the network address included in that access has been authenticated. Namely, server device 200 identifies terminal device 100 that has issued the request based only on the network address used in interaction with terminal device 100 in the network layer, without performing authentication processing in the application layer.

E. Exemplary Application

An exemplary service provided in network system 1 shown in FIG. 6 will now be described.

(e1: Exemplary Application No. 1)

A web server is assumed as server device 200 and such a configuration as providing a specific web page in accordance with a network address of terminal device 100 which makes an access will initially be described by way of example.

Figure 7:
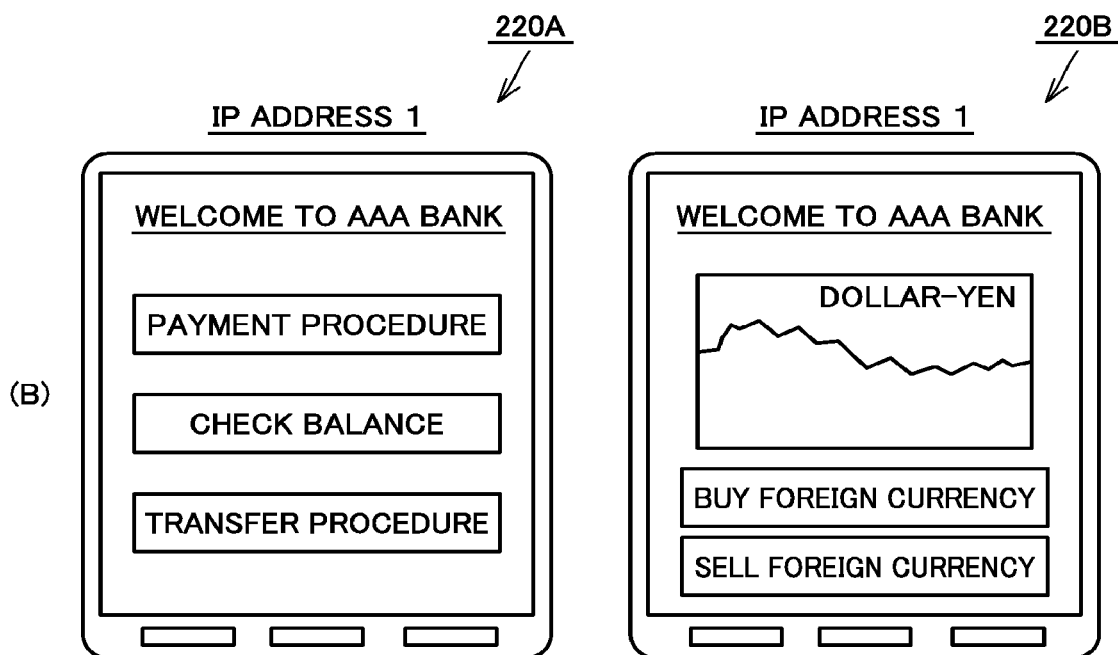
FIG. 7 is a diagram for illustrating an exemplary application for providing a service by utilizing the network system according to the present embodiment.

FIG. 7 is a diagram for illustrating an exemplary application for providing a service by making use of network system 1 according to the present embodiment. FIG. 7 shows at (A) an exemplary network management table 210 held by server device 200. In network management table 210, initial screen information 214 representing an initial screen and preference information 216 representing preference are defined in association with a network address (IP address) 212 of terminal device 100 that made an access in the past or will make an access. Contents in network management table 210 may be updated manually by a user or by server device 200 in response to an operation by a user.

When server device 200 is accessed from terminal device 100, the server device refers to network management table 210 with a network address provided to terminal device 100 serving as a key, and determines corresponding initial screen information 214 and preference information 216. Then, server device 200 determines contents of a web page to be provided to terminal device 100 that has made an access, based on determined initial screen information 214 and preference information 216.

FIG. 7 shows at (B) an exemplary web screen when server device 200 provides an on-line banking service by way of example. For example, in an exemplary web screen 220A presented on a display of terminal device 100 provided with an IP address 1, buttons for basic account management such as "payment procedure," "check balance," and "transfer procedure" are arranged. In an exemplary web screen 220B presented on the display of terminal device 100 provided with an IP address 2, buttons relating to foreign currency such as "buy foreign currency" and "sell foreign currency" are arranged together with a chart showing change over time of the exchange rate.

Such an initial screen can be determined, for example, by referring to initial screen information 214 in network management table 210. Furthermore, by referring to preference information 216 in network management table 210, not only the initial screen but also a service in accordance with preference can be provided for each terminal device 100 (that is, a user who operates terminal device 100).

As set forth above, the initial screen and various service contents provided at the time of access to server device 200 can be customized based on the network address provided to terminal device 100.

(e2: Exemplary Application No. 2)

A use management server in a hotel or the like is assumed as server device 200 and such a configuration as using terminal device 100 as an electronic key (a certificate for use) will now be described by way of example.

Figure 8:
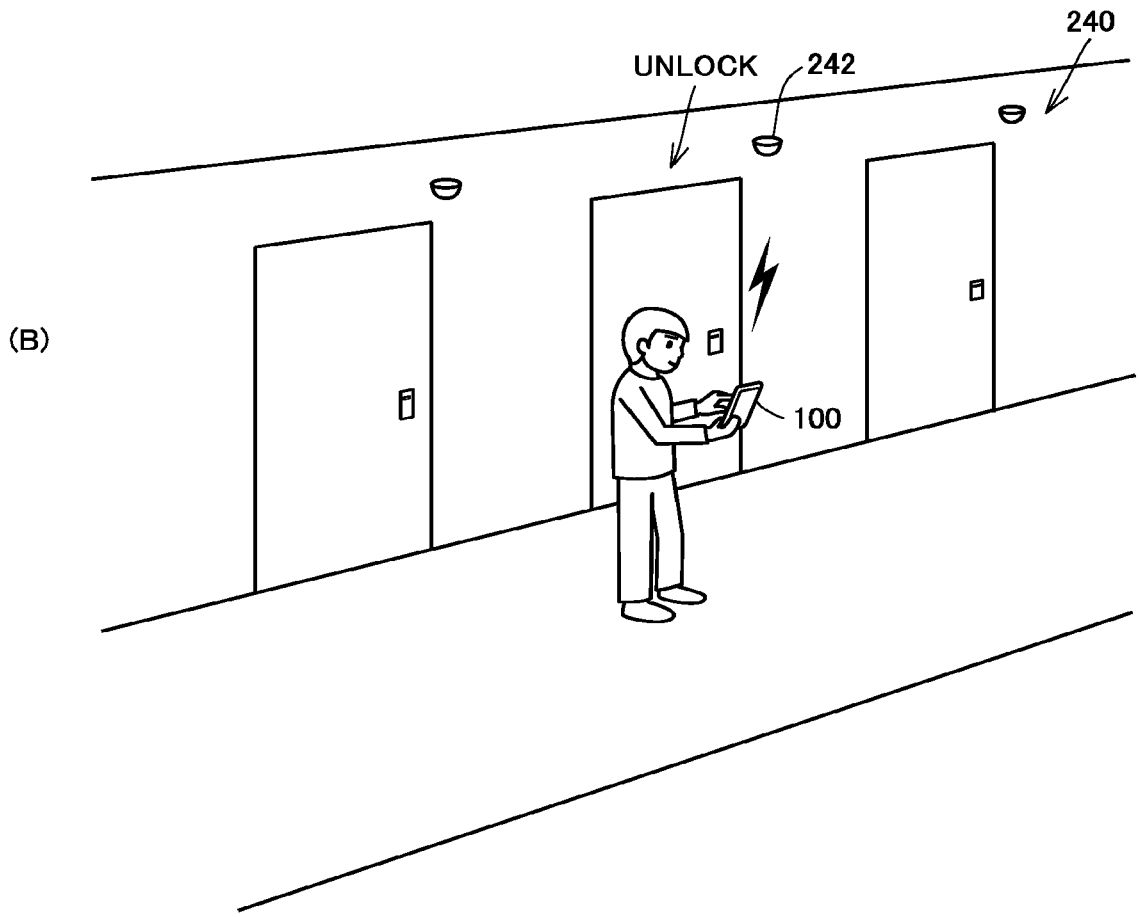
FIG. 8 is a diagram for illustrating another exemplary application for providing a service by utilizing the network system according to the present embodiment.

FIG. 8 is a diagram for illustrating another exemplary application for providing a service by making use of network system 1 according to the present embodiment. FIG. 8 shows at (A) an exemplary use management table 230 held by server device 200. Use management table 230 stores contents of booking made through a booking site (a room number 234 and an allowable period of stay 236) in association with a network address 232 provided to terminal device 100 used for a booking operation.

Specifically, when a user operates his/her own terminal device 100 to make a booking of an accommodation through a booking site, server device 200 adds contents of booking to use management table 230 together with the network address provided to terminal device 100 used for booking of the accommodation.

As shown in (B) of FIG. 8, a wireless communication unit 242 is arranged in front of each room of an accommodation 240. When a user who stays in the accommodation comes closer to a booked room while carrying terminal device 100 used for making the booking of the accommodation, wireless communication unit 242 establishes wireless communication with terminal device 100. Wireless communication between terminal device 100 and wireless communication unit 242 may be started automatically or in response to an explicit operation by the user.

Then, when the network address provided to terminal device 100 held by the user matches with any entry of network address 232 in use management table 230, server device 200 unlocks a booked room based on corresponding room number 234 and allowable period of stay 236.

Though FIG. 8 illustrates a configuration in which terminal device 100 is used as a key for each room of an accommodation such as a hotel as a typical example, the terminal device can be used as any certificate for use without being limited as such. For example, terminal device 100 itself can be used as an admission ticket for various facilities such as an amusement facility or various events such as concerts. Terminal device 100 itself can further also be used as a ticket for a train or an airplane.

As described above, in network system 1 according to the present embodiment, since the network address itself provided to terminal device 100 is authenticated, an application or the like for displaying a ticket is not required as in the existing technology, and barriers for prevalence of a system in which terminal device 100 itself is used as a certificate for use can be lowered.

As set forth above, terminal device 100 can readily be made use of as an arbitrary certificate for use based on a network address provided to terminal device 100.

(e3: Exemplary Application No. 3)

A configuration that realizes processing for authenticating a network address itself in a more multi-faceted manner will now be described. FIG. 9 is a diagram for illustrating exemplary filtering of a network address by making use of network system 1 according to the present embodiment. FIG. 9 shows an exemplary configuration in which address authentication program 136 is arranged in a third layer (the network layer) of the OSI reference model and TCP (or UDP) is arranged in a fourth layer (the transport layer) by way of example.

In FIG. 9, authentication management information 138 is arranged as a configuration for realizing filtering. Authentication management information 138 may include a black list 1382 and/or a white list 1384. Both of black list 1382 and white list 1384 do not have to be prepared and only any one of them may be prepared.

Black list 1382 defines a network address from which access should be blocked and white list 1384 defines a network address from which access should be permitted.

FIG. 9 shows at (A) an example in which a filtering function is implemented by address authentication program 136. More specifically, when an authenticated network address of a destination matches with any entry defined in black list 1382, address authentication program 136 cuts off or prohibits communication with a destination (a black list node) having the authenticated network address. Namely, a packet from the black list node is blocked by address authentication program 136 and not given to application 134.

Alternatively, only when the authenticated network address matches with any entry defined in white list 1384, address authentication program 136 allows communication with a destination (a white list node) having the authenticated network address. Namely, a packet from the white list node is given from address authentication program 136 to application 134. Application 134 provides a service based on the network address itself authenticated by address authentication program 136 and the received packet.

FIG. 9 shows at (B) an example in which the filtering function is implemented by application 134. More specifically, when application 134 receives a packet from address authentication program 136, it determines whether or not a network address (authenticated by address authentication program 136) of a sender of the packet matches with any entry in black list 1382 or white list 1384.

When the network address of the sender of the received packet matches with any entry defined in black list 1382, application 134 blocks the packet. When the network address of the sender of the received packet matches with any entry defined in white list 1384, application 134 processes that packet and provides a requested service.

As set forth above, in addition to the function to authenticate the network address itself, by combining the filtering function using the black list/the white list, a more practical network system can be realized.

F. Another Embodiment

Though a network system including one or more terminal devices 100 and one or more server devices 200 is illustrated as an exemplary configuration that uses a network address authenticated between devices in the embodiment described above, the configuration is also applicable to data communication between terminal devices 100 or between server devices 200 without being limited as such. Without being limited to a framework such as terminal device 100 or server device 200, the configuration is available for data communication between arbitrary devices.

G. Advantages

According to the present embodiment, a service using an authenticated network address and a platform for providing that service are provided. Since the network address itself is authenticated, establishment of communication connection per se can also serve as an authentication procedure, and an additional authentication procedure using the application is not required. A variety of services suitable for IoT can thus be provided.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 network system; 4 access point; 6 base station; 100, 100A, 100B terminal device; 102 processor; 104 main memory; 106 display; 108 input unit; 110 communication module; 112 address authentication chip; 114, 144 WiFi module; 116, 120, 146, 150 antenna; 118, 148 LTE module; 130 secondary storage; 132 OS; 134 application; 136 address authentication program; 138 authentication management information; 200 server device; 210 network management table; 212 network address (IP address); 214 initial screen information; 216 preference information; 220A, 220B exemplary screen; 230 use management table; 232 network address; 234 room number; 236 available time period; 240 accommodation; 242 wireless communication unit; 1322 data link driver; 1324 TCP/IP socket

The invention claimed is:

1. A network system comprising:
a server device with a processor and a memory; and
at least one terminal device with a processor and a memory,
wherein the server device is configured to execute:
a first application process, at an application layer, for providing a service, and
a first address authentication process, at a network layer, for authenticating a network address of a device accessing the server device;
wherein the terminal device is configured to execute:
a second application process, at the application layer, for accessing the service provided by the server device, and
a second address authentication process, at the network layer, for authenticating a network address of a device accessing the terminal device;
wherein in response to a request from the terminal device to the server device, the first address authentication process and the second address authentication process start authenticating the network addresses mutually, and
the first address authentication process and the second address authentication process allow data communication therebetween based on the authenticated network addresses in response to success of the authentication of the network addresses;
wherein in response to success of the authentication of the network addresses, the first application process determines a service to be provided to the terminal device based on the authenticated network address of the terminal device.

2. The network system according to claim 1, wherein the first application process provides an on-line banking service.

3. The network system according to claim 1, wherein the first application process refers to a data table in which initial screen information representing an initial screen for a user of the terminal device is associated with the authenticated network address of the terminal device.

4. The network system according to claim 1, wherein the first application process refers to a data table in which preference information representing preference of a user of the terminal device is associated with the authenticated network address of the terminal device.

5. The network system according to claim 1, wherein the first application process provides a service for unlocking a room based on the authenticated network address of the terminal device.

6. The network system according to claim 1, wherein the first application process refers to a data table in which a room number and an allowable period of stay are associated with the authenticated network address of the terminal device.

7. The network system according to claim 1, wherein at least one of the first address authentication process and the second address authentication process refers to at least one of a blacklist that defines a network address from which access should be blocked and a whitelist that defines a network address from which access should be permitted.

8. The network system according to claim 1, wherein the server device comprises:
a first communication program that causes the processer, when executed by the processor, to perform the first application process; and
an address authentication program that causes the processer, when executed by the processor, to perform the first address authentication process.

9. The network system according to claim 1, wherein the terminal device comprises:
a second communication program that causes the processer, when executed by the processor, to perform the second application process; and
an address authentication program that causes the processer, when executed by the processor, to perform the second address authentication process.

10. A method for network communication in a network system with a server device and at least one terminal device comprising:
providing a first application process for providing a service at an application layer of the server device;
providing a first address authentication process for authenticating a network address of a device accessing the server device at a network layer of the server device;
providing a second application process for accessing the service provided by the server device at the application layer of the terminal device;
providing a second address authentication process for authenticating a network address of a device accessing the terminal device at the network layer of the terminal device;
in response to a request from the terminal device to the server device, authenticating the network addresses at the first address authentication process and the second address authentication process mutually;

allowing data communication between the first address authentication process and the second address authentication process based on the authenticated network addresses in response to success of the authentication of the network addresses;

in response to success of the authentication of the network addresses, determining, at the first application process, a service to be provided to the terminal device based on the authenticated network address of the terminal device.

11. The method according to claim 10, wherein the service provided by the first application process comprises an online banking service.

12. The method according to claim 10, further comprising referring, at the first application process, to a data table in which initial screen information representing an initial screen for a user of the terminal device is associated with the authenticated network address of the terminal device.

13. The method according to claim 10, further comprising referring, at the first application process, to a data table in which preference information representing preference of a user of the terminal device is associated with the authenticated network address of the terminal device.

14. The method according to claim 10, wherein the service provided by the first application process comprises a service for unlocking a room based on the authenticated network address of the terminal device.

15. The method according to claim 10, further comprising referring, at the first application process, to a data table in which a room number and an allowable period of stay are associated with the authenticated network address of the terminal device.

16. The method according to claim 10, further comprising referring, by at least one of the first address authentication process and the second address authentication process, to at least one of a blacklist that defines a network address from which access should be blocked and a whitelist that defines a network address from which access should be permitted.

17. The method according to claim 10, wherein the server device comprises:
a first communication program that causes the processer, when executed by the processor, to perform the first application process; and
an address authentication program that causes the processer, when executed by the processor, to perform the first address authentication process.

18. The method according to claim 10, wherein the terminal device comprises:
a second communication program that causes the processer, when executed by the processor, to perform the second application process; and
an address authentication program that causes the processer, when executed by the processor, to perform the second address authentication process.

* * * * *